(12) United States Patent
Luinstra et al.

(10) Patent No.: US 8,022,146 B2
(45) Date of Patent: Sep. 20, 2011

(54) COPOLYMERS OF PARA-ALPHA DIMETHYLSTYRENE AND THERMOPLASTIC COMPOSITIONS

(75) Inventors: Gerrit Luinstra, Hamburg (DE); Florian Becker, Mannheim (DE); Matthias Müller, Pfungstadt (DE); Dirk Meckelnburg, Limburgerhof (DE); Jens Assmann, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/742,843

(22) PCT Filed: Nov. 11, 2008

(86) PCT No.: PCT/EP2008/065283
§ 371 (c)(1),
(2), (4) Date: May 13, 2010

(87) PCT Pub. No.: WO2009/062927
PCT Pub. Date: May 22, 2009

(65) Prior Publication Data
US 2010/0261831 A1    Oct. 14, 2010

(30) Foreign Application Priority Data

Nov. 13, 2007 (EP) .................................. 07120547

(51) Int. Cl.
*C08F 20/42* (2006.01)
*C08L 51/00* (2006.01)
(52) U.S. Cl. .......... 525/241; 525/77; 524/504; 526/312; 526/328.5; 526/341; 526/347; 526/347.1

(58) Field of Classification Search .................. 525/241, 525/77; 524/504; 526/312, 328.5, 341, 347, 526/347.1
See application file for complete search history.

(56) References Cited

U.S. PATENT DOCUMENTS

| | | | |
|---|---|---|---|
| 2,310,961 A * | 2/1943 | Kropa | ........................... 526/200 |
| 2,520,959 A | 9/1950 | Powers | |
| 3,397,165 A | 8/1968 | Goodman et al. | |
| 3,642,949 A | 2/1972 | Stafford et al. | |
| 4,224,419 A | 9/1980 | Swoboda et al. | |
| 4,294,946 A | 10/1981 | Minematsu et al. | |

FOREIGN PATENT DOCUMENTS

| | | |
|---|---|---|
| DE | 2036420 A1 | 2/1971 |
| DE | 2826925 A1 | 1/1980 |
| EP | 0022200 A1 | 1/1981 |
| EP | 0712895 A2 | 5/1996 |
| EP | 0721476 B1 | 2/1998 |
| GB | 1310134 A | 3/1973 |
| JP | 50083429 A | 7/1975 |
| JP | 56-109221 A | 8/1981 |

OTHER PUBLICATIONS

Walling, C., et al., "Copolymerization. XII. The effect of m- and p-substitution on the reactivity of α-methylstyrene toward the maleic anhydride type radical," Journal of the American Chemical Society, 1948, vol. 70, pp. 1544-1547.

* cited by examiner

*Primary Examiner* — Robert D. Harlan
(74) *Attorney, Agent, or Firm* — Connolly Bove Lodge & Hutz LLP

(57) ABSTRACT

A thermoplastic copolymer prepared from acrylonitrile and para-alpha-dimethylstyrene via bulk or solution polymerization has an improved heat distortion temperature and can be used together with graft copolymers and further components for the preparation of thermoplastic moldings.

11 Claims, 1 Drawing Sheet

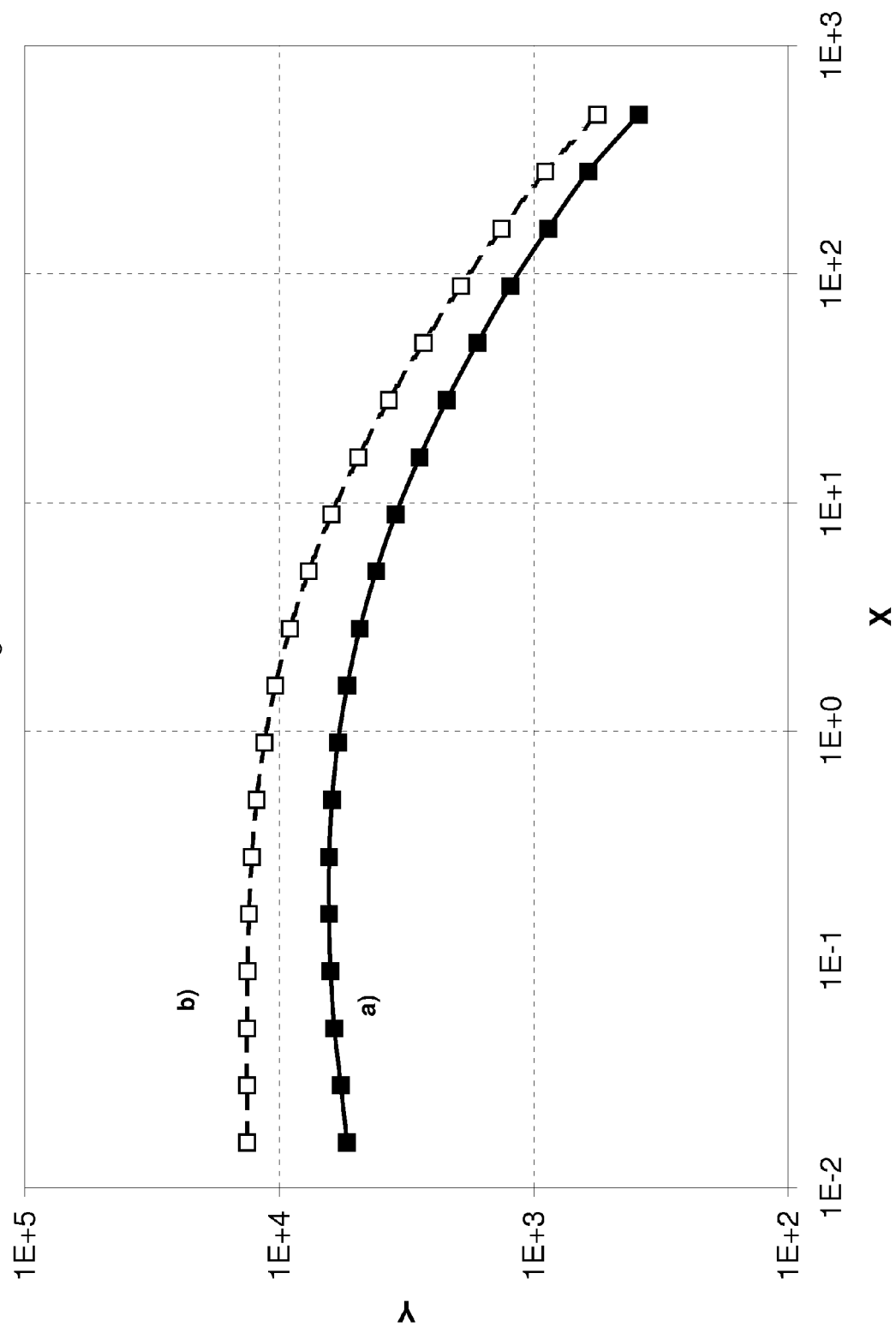

COPOLYMERS OF PARA-ALPHA DIMETHYLSTYRENE AND THERMOPLASTIC COMPOSITIONS

CROSS-REFERENCE TO RELATED APPLICATIONS

This application is a national stage application (under 35 U.S.C. §371) of PCT/EP2008/065283, filed Nov. 11, 2008, which claims benefit of European application 07120547.0, filed Nov. 13, 2007.

BACKGROUND OF THE INVENTION

The present invention relates to copolymers containing para-alpha-dimethylstyrene, to a thermoplastic composition and its preparation.

The preparation of copolymers of para-alpha-dimethylstyrene (DMS) with further monomers, e.g. acrylonitrile (AN), maleic acid derivatives (in particular anhydride and imines) leads to thermoplastic molding materials with improved properties and in particular to improved heat distortion temperatures. The use of natural sources, like limonene, alpha-, beta-pinenes or other terpenes, to prepare the monomer DMS which has the following formula

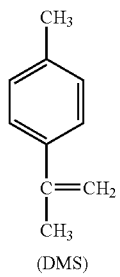

(DMS)

is also part of the invention. Also the further monomers, like acrylonitrile, can be prepared starting from natural sources, e.g. from amino acids.

The synthesis of polymers and copolymers from or containing styrene has long been known. A historical overview is outlined e.g. in "Modern Styrenic Polymers: Polystyrene and Styrenic Copolymers" (edited by J. Scheirs and D. B. Priddly, John Wiley and Sons, 2003).

There are several problems involved in pure polystyrene, like e.g. its brittleness and chemical resistance. In order to prepare a thermoformable composition based on the monomer styrene with a higher heat distortion temperature, copolymers of styrene with other monomers were prepared. One commercial important derivative is a copolymer of styrene with acrylonitrile, usual referred to SAN copolymer. The Vicat softening point of such polymers is in the range of 103-120° C., with an average of about 110° C. These polymers are described e.g. in EP-A 022 200, U.S. Pat. No. 4,294,946 and EP-A 0 712 895.

Several strategies are known to improve the Vicat temperature, each however with particular disadvantages. Thus instead of using styrene as a monomer, alpha-methylstyrene was proposed in the literature. It was found years ago that the Vicat temperature of copolymers improved by using alpha-methylstyrene instead of or on addition to styrene. However, the monomer alpha-methylstyrene is not readily polymerized, and remaining monomers are hard to remove from the thermoplastic composition. Furthermore, the copolymers often have an unpleasant smell. The improvement of the property heat-distortion-temperature (HDT) in these copolymers and in economically important blends of SAN and PVC is not so effective as with blends of PVC with copolymers of maleic N-phenyl imide on a weight to weight basis.

The preparation of copolymers from styrene and maleic anhydride or maleic N-imides has been reported to arrive at copolymer materials with high glass temperatures. The copolymer from styrene and maleic anhydride however is very brittle and the copolymers from styrene and maleic-N-imides contain nitrogen and tend to strongly yellow on thermal processing procedures particularly at higher temperatures, which is disadvantageous (see e.g. U.S. Pat. No. 3,642,949 and EP-A 0 721 476).

The use of various mixtures of para-and meta-alpha-dimethylstyrene has been described in the literature. In DE-A 2036420 the polymerization of acrylonitrile with polybutadien and dimethylated styrene is described. Here also an improvement in the glass temperature can be reached. The heat distortion temperature (HDT) of these copolymers was found to be up to 131° C. These copolymers however do not reach the goal to provide with a cheap modifier for polymers like PVC.

A further incentive to reach a suitable copolymer of styrene derivatives and acrylonitrile with a good heat distortion temperature is the fact that styrene today is not considered as being a sustainable monomer. As the sources of oil and gas are more and more limited, monomers are preferred which can be obtained from natural and in particular plant sources.

BRIEF SUMMARY OF THE INVENTION

It now was found that copolymers of derivatives of styrene (like para-alpha-dimethylstyrene and alpha-methylstyrene) with acrylates or with acrylonitrile can be useful materials for example for the use in the automotive sector, medical sector, nautical and aeronautical sector, cosmetic and food sector, consumer goods, for electronic or electric devices, sporting articles, furniture or in packaging. Examples of usage are in optical discs, housing of mobile phones, computers, laptops, notebooks, MP3-player, photo-or video-cameras, DVD-or BluRay player or other electronic devices like gaming consoles.

Another possible use is in foams which might be either completely made out of the copolymers or made from blends containing the copolymers described in this invention. Advantages of said foams are in particular the good chemical and temperature stability compared to prior art foams, e.g. polystyrene foams.

The above mentioned technical problems involved with classical copolymers of styrene, in particular:
 a) unpleasant residual monomers in the copolymer,
 b) yellowing of the composition,
 c) unsatisfactory heat distortion temperature,
 d) non-sustainable monomer basis, and
 e) low space-time yield.
are considerable disadvantages for the various uses mentioned and the need for a better solution is great.

The group of thermoplastic materials now found has the advantages of an alpha-methyl-SAN but has an appreciable higher heat distortion and/or glass transition temperature and can be prepared, even in high amounts, in a more efficient production process. The flow properties of these thermoplastic materials are excellent, which can lead to reduced cycle times in injection molding processes and/or less energy consumption because parts can be injection molded at lower temperatures.

The invention in particular relates to a thermoplastic copolymer (A) which comprises:

A1: from 38 to 58 mol-percent, based on the copolymer, of at least one of the monomers from the group consisting of acrylonitrile, acrylate, methacrylate, maleic anhydride and N-phenyl-maleic imide; and A2: from 42 to 62 mol-percent, based on the copolymer, of para-alpha-dimethylstyrene or of a mixture of para-alpha-dimethylstyrene with other styrene-derivatives, preferably having 9 or 10 carbon atoms, wherein the sum of A1 and A2 gives 100 mol-percent; and eventually K: from 0 to 5% by weight based on the copolymer, of further components K, where the entirety composed of thermoplastic copolymer and of further components K gives exactly 100% by weight. The thermoplastic copolymer (A) can comprise further components and can be combined with other thermoplastic copolymers.

DETAILED DESCRIPTION OF THE INVENTION

A particular embodiment of the invention relates to a thermoplastic copolymer (A) wherein the component A1 is acrylonitrile, $C_1$-$C_{12}$-alkyl-acrylate, $C_1$-$C_{12}$-methalkyl-acrylate, maleic anhydride or N-phenyl-maleic imide.

One embodiment of the invention relates to a thermoplastic copolymer (A) wherein the component A2 comprises or more preferred consists of para-alpha-dimethylstyrene or of a mixture of para-alpha-dimethylstyrene with alpha-methylstyrene.

A further embodiment of the invention relates to a thermoplastic copolymer (A) which comprises from 38 to 58 mol-percent of acrylonitrile and from 42 to 62 mol-percent of para-alpha-dimethylstyrene.

The invention also relates to thermoplastic copolymers (A), which comprises from 42 to 54 mol-percent of the component A1 which consists of acrylonitrile, maleic anhydride or N-phenyl-maleic imide (or mixtures thereof), and which comprises from 46 to 58 mol-percent of the component A2, which contains para-alpha-dimethylstyrene and alpha-methylstyrene.

A particular embodiment of the invention relates to a thermoplastic copolymer (A) which comprises from 42 to 54 mol-percent of acrylonitrile and from 46 to 58 mol-percent of a combination of para-alpha-dimethylstyrene and alpha-methylstyrene, whereby the weight ratio of the components para-alpha-dimethylstyrene and alpha-methylstyrene is between 1 to 4 and 4 to 1, preferably between 1 to 3 and 3 to 1 and in particular between 1 to 2 and 2 to 1.

In a further preferred embodiment of the invention, the thermoplastic copolymer (A) contains 46 to 58 mol-percent of the monomer para-alpha-dimethylstyrene and 42 to 54 mol-percent of acrylonitrile.

The invention also relates to thermoplastic copolymers (A) wherein the component A1 consists of acrylonitrile and wherein the component A2 consists of para-alpha-dimethylstyrene. The component A2 preferably is prepared from biological sources, as described later. Also the component A1 can be prepared from biological sources.

One embodiment of the invention relates to a thermoplastic copolymer (A) which is composed of 48 to 58 mol-percent of the monomer para-alpha-dimethylstyrene and of 42 to 52 mol-percent of acrylonitrile. The molar ratio of the two components A1 and A2 in the copolymer (A) and in particular of the two monomers cited often is close to 1 to 1 (e.g. between 1,1 to 1 and 1 to 1,1).

A further aspect of the invention deals with a thermoplastic molding composition comprising a thermoplastic copolymer (A) as described, a graft copolymer (B) and optionally further components (K), one or more components selected from the group of the dispersing agents (DA), buffer substances (BS), molecular weight regulators (MR), fillers (F), and additives (D).

A further aspect of the invention deals with thermoplastic molding compositions comprising at least one thermoplastic copolymer (A) as described (eventually together with other SAN-matrices or with alpha-methylstyrene/AN-matrices), a graft copolymer (B) (e.g. an ABS or an ASA-copolymer) and as further components (K), one or more components selected from the group of the dispersing agents (DA), buffer substances (BS), molecular weight regulators (MR), fillers (F), and additives (D). These components are described later.

Another embodiment of the invention relates to a thermoplastic molding composition comprising as graft copolymer (B) an ABS copolymer (e.g. prepared by emulsion polymerization, optionally using a redox initiator system) and eventually as further component (K) at least one dispersing agent (DA).

A particular embodiment of the invention relates to a thermoplastic molding composition which comprises as further component at least one further thermoplastic polymer (TP) selected from the group of the ABS-copolymers, SAN-copolymers, polycarbonates, polyester carbonates, polyesters and polyamides. These further components of polymer-blends are described later.

The invention also relates to the use of a thermoplastic copolymer (A) as described above for the production of various moldings. One further aspect are the moldings produced from at least one thermoplastic molding composition containing a thermoplastic copolymer (A).

There are several methods for preparing the thermoplastic copolymer (A) according to the invention. One process for preparation of a thermoplastic copolymer (A) comprises the step of bulk polymerization, emulsion polymerization or solution polymerization of para-alpha-dimethylstyrene and eventually other styrene-derivatives (e.g. meta-alpha-dimethylstyrene; ortho-alpha-dimethylstyrene; alpha-methylstyrene) with monomers from the group comprising acrylonitrile, acrylate, methacrylate, maleic anhydride and N-phenyl-maleic imide. A particular process comprises the step of bulk polymerization or solution polymerization of a mixture comprising or often consisting of para-alpha-dimethylstyrene and acrylonitrile. Often the polymerization is performed in the presence of small amounts of a solvent (e.g. ethyl-benzene). The general methods for the various types of polymerization are known in the literature.

The invention also relates to a process for preparation of a thermoplastic molding composition which comprises preparing the thermoplastic copolymer (A) via bulk polymerization or solution polymerization (emulsion polymerization is also possible), preparing a graft copolymer (B), (e.g. starting from butadiene and/or styrene; then building a copolymer shell of acrylonitrile and styrene) and then mixing the thermoplastic copolymer (A) and the graft copolymer (B), and also, if appropriate, the further components K and/or the further thermoplastic polymers (TP).

The copolymer (A) according to the invention has a sustainable monomer basis and does not necessarily contain the element nitrogen (e.g. if acrylates are used in stead of acrylonitrile). Furthermore, the thermoplastic material prepared has a pleasant odor.

Furthermore, it is possible to prepare the copolymers (A) of para-alpha dimethylstyrene (DMS) and acrylonitrile and/or other monomers in an easy to handle and fast production process, preferably by bulk polymerization or with the addition of a solvent.

The monomer DMS is readily available in a sustainable way through the dehydrogenation of e.g. limonene (L), which can be obtained from oranges (e.g. peels of oranges) and other citrus plants.

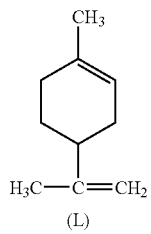

(L)

Limonene (L) is a widely available natural source. DMS can be prepared from limonene through oxidation with nitrobenzene, which is a common used solvent and basis for the production of aniline (see "Investigations into the mechanism of action of nitrobenzene as a mild dehydrogenating agent under acid-catalysed conditions", M. Lurdes et al., Org. Biomol. Chem., 2003, 1, 565-574). The monomer DMS is also known to be a fragrance, having a good odour.

The copolymerization of DMS and acrylonitrile (AN) can be performed in a number of different ways. Several polymerization mechanisms can be used, for example either radically, cationically, anionically or through the application of a catalyst. Examples of suitable preparation processes for the copolymers are emulsion polymerization, solution polymerization, suspension polymerization, or bulk polymerization. The copolymers according to the invention can also be prepared via aqueous free-radical emulsion polymerization. DE-A 28 26 925 and EP-A 022 200 inter alia describe suitable polymerization processes.

By way of example, the copolymer containing DMS can be prepared via free-radical-initiated aqueous emulsion polymerization, by using a portion of the monomers (e.g. DMS and acrylonitrile in an aqueous reaction medium as initial charge and adding the remaining residual amount of monomers, if appropriate, in the aqueous reaction medium after initiation of the free-radical polymerization reaction. It is also possible to use at least a portion of the free-radical polymerization initiator and, if appropriate, of further auxiliaries in the aqueous reaction medium as initial charge, to bring the resultant aqueous reaction medium to polymerization temperature, and at this temperature to add the monomers to the aqueous reaction medium. This introduction can also take the form of a mixture, for example the form of an aqueous monomer emulsion.

The reaction can be initiated via water-soluble or oil-soluble free-radical polymerization initiators, e.g. inorganic or organic peroxides (for example peroxodisulfate or benzoyl peroxide), or with the aid of redox initiator systems. It is often preferable that peroxodisulfate is used as initiator.

The present invention also provides a thermoplastic molding composition which comprises a copolymer (A) containing DMS as described above and as further components (K), one or more components selected from the group of the dispersing agents (DA), buffer substances (BS), molecular weight regulators (MR), fillers (F), and additives (D), like e.g. stabilizers, flow additives, flame retardants, and blocking aids.

In one preferred embodiment of the invention, the free-radical initiator used in preparation of the copolymer (A) comprises a peroxodisulfate, in particular potassium peroxodisulfate (PPS), in combination with further ancillary components. It is possible to use, inter alia, a buffer (e.g. bicarbonate) and potassium stearate as soap.

The molecular weight regulator (MR) used can by way of example comprise tert-dodecyl mercaptan (TDM) which can be added continuously or else at various junctures during the process of preparation of the rubber latex. The manner of addition of the regulator can have an effect on the properties of the final product.

For the purposes of the polymerization process described, dispersing agents (DA) can be also used, which keep not only the monomer droplets but also the polymer particles formed in the (aqueous) medium in dispersion and thus ensure that the (aqueous) polymer dispersion produced is stable. Dispersing agents (DA) that can be used are not only the protective colloids usually used for conduct of free-radical aqueous emulsion polymerizations but also commercially available emulsifiers. Examples of suitable protective colloids are polyvinyl alcohols, polyalkylene glycols, alkali metal salts of polyacrylic acids and polymethacrylic acids, and gelatin derivatives.

Further examples of suitable protective colloids are copolymers, and their alkali metal salts, comprising acrylic acid, methacrylic acid, maleic anhydride, 2-acrylamido-2-methylpropanesulfonic acid, and/or 4-styrenesulfonic acid. Other suitable protective colloids are homo-and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-group-bearing acrylates, methacrylates, acrylamides, and/or methacrylamides. Houben-Weyl, Methoden der organischen Chemie, volume XIV/1, Makromolekulare Stoffe, Georg-Thieme-Verlag, Stuttgart, 1961, pages 411-420 gives a detailed description of other suitable protective colloids.

It is also possible to use a mixture composed of protective colloids and/or of emulsifiers. The dispersing agents used often comprise exclusively emulsifiers whose molecular weights, unlike those of the protective colloids, are usually below 1000. They can be either anionic, cationic or non-ionic. If mixtures of surfactants are used, the individual components must be compatible with one another. Anionic emulsifiers are generally compatible with one another and with non-ionic emulsifiers.

The same applies to cationic emulsifiers, while anionic and cationic emulsifiers are mostly not compatible with one another. Houben-Weyl, Methoden der organischen Chemie, (Volume XIV/1, Makromolekulare Stoffe, Georg-Thieme-Verlag, Stuttgart, 1961, pages 192-208) gives an overview of suitable emulsifiers. Examples of familiar non-ionic emulsifiers are ethoxylated mono-, di-and trialkylphenols and also ethoxylated fatty alcohols. Examples of usual anionic emulsifiers are the alkali metal and ammonium salts of alkyl sulfates (with alkyl radicals of: $C_8$-$C_{12}$), of sulfuric half-esters of ethoxylated alkanols (alkyl radical: $C_{12}$-$C_{18}$) and of ethoxylated alkylphenols (alkyl radicals: $C_4$-$C_{12}$) and of alkylsulfonic acids (alkyl radical: $C_{12}$-$C_{18}$).

Suitable cationic emulsifiers are e.g. $C_6$-$C_{18}$-alkyl-bearing or alkylaryl-bearing or heterocyclic-radical-bearing primary, secondary, tertiary or quaternary ammonium salts, pyridinium salts, imidazolinium salts, ozazolinium salts, morpholinium salts, tropylium salts, sulfonium salts and phosphonium salts. By way of example, mention may be made of dodecylammonium acetate or the corresponding sulfate, disulfates or acetates of the various 2-(N,N,N-trimethylammonium)ethyl paraffinates, N-cetylpyridinium sulfate and N-laurylpyridinium sulfate. The emulsifiers and protective colloids can also be used in the form of mixtures.

The total amount used of the emulsifiers preferably used as dispersing agents is advantageously from 0.005 to 5% by weight, preferably from 0.01 to 5% by weight, in particular from 0.1 to 3% by weight, always based on the total monomer concentration. The total amount used of the protective colloids used as dispersing agents, instead of the emulsifiers or in addition thereto is often from 0.1 to 10% by weight and frequently from 0.2 to 7% by weight, always based on the total concentration of monomers. However, the dispersing agents used preferably comprise anionic and/or non-ionic emulsifiers and particularly preferably anionic emulsifiers.

Further polymerization auxiliaries that can be used in the polymerization are the conventional buffer substances (BS) which can establish pH values which are often from 6 to 11, examples being sodium bicarbonate and sodium pyrophosphate, and also from 0 to 3% by weight of a molecular weight regulator (MR), such as mercaptans, terpinols or dimeric α-methylstyrene. The buffer substances can also have complexing action.

The polymerization reaction can e.g. be carried out in the temperature range from 0 to 170° C. The temperatures used for emulsion polymerization are generally from 40 to 120° C., often from 50 to 110° C. and frequently from 60 to 100° C.

Optionally, the free-radical-initiated polymerization can also be carried out in the presence of a polymer seed, for example in the presence of from 0.01 to 3% by weight, often from 0.03 to 2% by weight and frequently from 0.04 to 1.5% by weight, of a polymer seed, in each case based on the total amount of monomer. A polymer seed can be used particularly when the particle size of the polymer particles to be prepared by means of free-radical aqueous emulsion polymerization is to be set in a controlled fashion, as described in U.S. Pat. Nos. 2,520,959 and 3,397,165.

The polymerization process can be run in batch, semi-batch or continuous mode.

One preferred copolymer according to the invention is prepared from DMS and acrylonitrile. The amounts of acrylonitrile and DMS in the final copolymer are typically from 42 to 54 mol-percent of acrylonitrile and from 58 to 46 mol-percent of DMS.

As described above, the preferred copolymer component is a poly-para-alpha-dimethyl-styrene-acrylonitrile. Preference is given here to copolymers with (weight-average) molar masses $M_w$ of from 70 000 to 300 000 g/mol. The molar masses can e.g. be determined via light scattering in e.g. tetrahydrofuran. In one preferred embodiment of the invention, the copolymer (A) is isolated after preparation by processes known to the person skilled in the art and preferably processed to give pellets.

As mentioned before, the inventive copolymers (A) can also, for example, be mixed with further thermoplastic polymers (TP). Those that can be used here are often ABS-copolymers, semicrystalline polyamides, semiaromatic copolyamides, polyesters, polyoxyalkylene, polyarylene sulfides, polyether ketones, polyvinyl chlorides, and/or polycarbonates.

The suitable polycarbonates and, respectively, polyester carbonates can be linear or branched. Branched products are preferably obtained via incorporation of from 0.05 to 2.0 mol-percent, based on the entirety of the diphenols used, of compounds whose functionality is three or more, e.g. those having three or more phenolic OH groups. The polycarbonates and polyester carbonates can comprise halogen bonded to an aromatic system, preferably bromine and/or chlorine. However, they are preferably halogen-free. Their average molecular weights ($M_w$, weight-average; determined, for example, via ultracentrifuging or scattered light measurement) are from 10 000 to 200 000, preferably from 20 000 to 80 000.

Suitable thermoplastic polyesters are preferably polyalkylene terephthalates, i.e. reaction products composed of aromatic dicarboxylic acids or of their reactive derivatives (e.g. dimethyl esters or anhydrides) and of aliphatic, cycloaliphatic, or arylaliphatic diols, and mixtures of these reaction products. Preferred polyalkylene terephthalates can be prepared from terephthalic acids (or from their reactive derivatives) and from aliphatic or cycloaliphatic diols having from 2 to 10 carbon atoms, by known methods (see Kunststoff-Handbuch [Plastics Handbook], volume VIII. pp. 695 et seq., Carl Hanser Verlag, Munich 1973).

Suitable polyamides for mixing the copolymers of the invention are known homopolyamides, copolyamides, and mixtures of these polyamides. These can be semicrystalline and/or amorphous polyamides. Semicrystalline polyamides that can be used are nylon-6, nylon-6,6, and mixtures, and corresponding copolymers composed of these components. It is also possible to use semicrystalline polyamides whose acid component is composed entirely or to some extent of terephthalic acid and/or isophthalic acid and/or suberic acid and/or sebacic acid and/or azelaic acid and/or adipic acid and/or cyclohexanedicarboxylic acid, and whose diamine component is composed entirely or to some extent of m-and/or p-xylylenediamine and/or hexamethylenediamine and/or 2,2,4-trimethylhexamethylenediamine and/or 2,2,4-trimethylhexamethylenediamine and/or isophoronediamine, and whose constitution is known. Mention may also be made of polyamides which are prepared entirely or to some extent from lactams having from 7 to 12 carbon atoms in the ring, if appropriate with concomitant use of one or more of the abovementioned starting components.

Amorphous polyamides that can be used are known products which are obtained via polycondensation of diamines, such as ethylenediamine, hexamethylenediamine, decamethylenediamine, 2,2,4-and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl, 3,5,5-trimethylcyclohexylamine, 2,5-and/or 2,6-bis(aminomethyl)norbornane, and/or 1,4-diaminomethylcyclohexane, with dicarboxylic acids, such as oxalic acid, adipic acid, azelaic acid, decanedicarboxylic acid, heptadecanedicarboxylic acid, 2,2,4-and/or 2,4,4-trimethyladipic acid, isophthalic acid, and terephthalic acid.

Other suitable copolymers are those obtained via polycondensation of a plurality of monomers, and also copolymers prepared using addition of aminocarboxylic acids, such as ε-aminocaproic acid, ω-aminoundecanoic acid, or ω-aminolauric acid, or lactams thereof. Particularly suitable amorphous polyamides are the polyamides prepared from isophthalic acid, and from hexamethylenediamine and from further diamines, such as 4,4'-diaminodicyclohexylmethane, isophoronediamine, 2,2,4-and/or 2,4,4-trimethylhexamethylenediamine, 2,5-and/or 2,6-bis(aminomethyl)norbornene; or from isophthalic acid, 4,4'-diaminodicyclohexylmethane, and ε-caprolactam; or from isophthalic acid, 3,3'-dimethyl-4,4'-diaminodicyclohexylmethane and laurolactam; or from terephthalic acid and from the isomer mixture composed of 2,2,4-and/or 2,4,4-trimethylhexamethylenediamine.

If use is also made of at least one polymer selected from the group of the polycarbonates, polyesters, polyester carbonates, and polyamides, its amount is up to 500 parts by weight, preferably up to 400 parts by weight, and particularly preferably up to 300 parts by weight (based in each case on 100 parts by weight of the copolymer (A) containing DMS). However, it is also possible to use mixtures composed of two or more of the polymers mentioned. The inventive thermoplastic molding compositions can comprise from 0 to 90% by weight, preferably from 0 to 50% by weight, of the abovementioned polymers.

The inventive thermoplastic molding compositions can also comprise, as a component, from 0 to 50% by weight, preferably from 0 to 40% by weight, in particular from 0 to 30% by weight, of fibrous or particulate fillers (F), or of a mixture of these, based in each case on the amount of copolymer (A). By way of example, fillers or reinforcing materials that can be added are glass fibers, which may have been provided with a size and with a coupling agent, glass beads, mineral fibers, aluminum oxide fibers, mica, powdered quartz, or wollastonite. Metal flakes, metal powders, metal fibers, or metalcoated fillers, e.g. nickel-coated glass fibers, can also be admixed with the inventive molding compositions, as also can other additives which provide shielding from electromagnetic waves. Carbon fibers, or carbon black, in particular conductive carbon black, or nickel-coated carbon fibers, can also be added.

Ancillary and processing additives that can be added to the inventive thermoplastic compositions comprise amounts of from 0 to 10% by weight, preferably from 0 to 5% by weight, in particular from 0 to 4% by weight, of various additives (D). Additives (D) that can be used are any of these substances which are usually used for the processing or modification of the polymers.

Examples that may be mentioned are dyes, pigments, colorants, biocides (in particular anti-bacterial, anti-fungal), antistatic agents, antioxidants, flame retardants, stabilizers for improving thermal stability, stabilizers for increasing lightfastness, stabilizers for raising resistance to hydrolysis and to chemicals, agents to counteract thermal decomposition, and in particular lubricants, these being advantageous for the production of moldings. These further additives can be metered into the material at any stage of the preparation or production process, but preferably at an early juncture, in order to utilize the stabilizing effect (or other specific effects) of the additives at an early stage. With respect to further conventional auxiliaries and additives, reference is made by way of example to "Plastics Additives Handbook", Ed. Gächter and Müller, 4th edition, Hanser Publ., Munich, 1996.

Examples of suitable pigments are titanium dioxide, phthalocyanines, ultramarine blue, iron oxides, or carbon black, and also the entire class of organic pigments.

Examples of suitable colorants are any of the dyes that can be used for the transparent, semitransparent, or nontransparent coloring of polymers, in particular those which are suitable for the coloring of styrene copolymers.

Examples of biocides are isothiazolinones or metal salts (e.g. from silver).

Examples of suitable flame retardants that can be used are the compounds known to the person skilled in the art and which comprise halogen or comprise phosphorus, other examples being magnesium hydroxide, and also other familiar compounds, or a mixture of these.

Examples of suitable antioxidants are sterically hindered mononuclear or polynuclear phenolic antioxidants, which can have various types of substitution and can also have bridging by way of substituents. Among these are not only monomeric but also oligomeric compounds which can be composed of a plurality of phenolic parent systems. Hydroquinones and hydroquinone-analogous, substituted compounds can also be used, as also can antioxidants based on tocopherols and on derivatives of these. It is also possible to use a mixture of various antioxidants. In principle, it is possible to use any of the commercially available compounds or compounds suitable for styrene copolymers, e.g. Irganox. The substances known as co-stabilizers, in particular co-stabilizers comprising phosphorus or comprising sulfur, can be used concomitantly together with the phenolic antioxidants mentioned by way of example above. The person skilled in the art is aware of these co-stabilizers comprising P or comprising S.

Examples of suitable light stabilizers are various substituted resorcinols, salicylates, benzotriazoles, and benzophenones. Matting agents that can be used are not only inorganic substances, such as talc, glass beads, or metal carbonates (e.g. $MgCO_3$, $CaCO_3$), but also polymer particles—in particular spherical particles whose diameters $d_{50}$ (weight-average) are above 1 µm—based on, for example, methyl methacrylate, styrene compounds, acrylonitrile, or a mixture of these. It is also possible to use polymers which comprise copolymerized acidic and/or basic monomers.

Examples of suitable antidrip agents are polytetrafluoroethylene (Teflon) polymers and ultrahigh-molecular-weight polystyrene (molecular weight $M_w$ above 2 000 000).

Examples of fibrous or pulverulent fillers are carbon fibers or glass fibers in the form of glass wovens, glass mats, or glass silk rovings, chopped glass, or glass beads, or else wollastonite, particularly preferably glass fibers. If glass fibers are used, these may have been equipped with a size and with a coupling agent to improve compatibility with the components of the blend. The glass fibers incorporated can take the form either of short glass fibers or else of continuous-filament strands (rovings).

Examples of suitable particulate fillers are carbon black, amorphous silica, magnesium carbonate (chalk), powdered quartz, mica, bentonites, talc, feldspath, or in particular calcium silicates, such as wollastonite, and kaolin.

Examples of suitable antistatic agents are amine derivatives, such as N,N-bis(hydroxyalkyl)alkylamines or -alkyleneamines, polyethylene glycol esters, copolymers composed of ethylene oxide glycol and of propylene oxide (in particular two-block or three-block copolymers in each case composed of ethylene oxide blocks and of propylene oxide blocks) glycol, and glycerol mono-and distearates, and also mixtures of these.

Examples of suitable stabilizers are hindered phenols, but also vitamin E and compounds whose structure is analogous thereto, and also butylated condensates of p-cresol and dicyclopentadiene. HALS stabilizers (Hindered Amine Light Stabilizers), benzophenones, resorcinols, salicylates, and benzotriazoles are also suitable. Examples of other suitable compounds are thiocarboxylic esters. It is also possible to use $C_6$-$C_{20}$ fatty acid esters of thiopropionic acid, particularly the stearyl esters and lauryl esters. It is also possible to use dilauryl thiodipropionate, distearyl thiodipropionate, or a mixture of these. Examples of further additives are HALS absorbers, such as bis(2,2,6,6-tetramethyl-4-piperidyl) sebacate, or UV absorbers, such as 2H-benzotriazol-2-yl(4-methyphenol). The amounts usually used of these additives are from 0.01 to 2% by weight (based on the entire mixture).

Suitable lubricants and mold-release agents are stearic acids, stearyl alcohol, stearic esters, amide waxes (bisstearylamide), polyolefin waxes, and generally higher fatty acids, derivatives of these, and corresponding fatty acid mixtures having from 12 to 30 carbon atoms. Another particularly suitable substance is ethylenebisstearamide (e.g. Irgawax, producer: Ciba, Switzerland). The amounts of these additives are in the range from 0.05 to 5% by weight.

Silicone oils, oligomeric isobutylene, or similar substances can be used as additives. The usual amounts, if they are used, are from 0.001 to 3% by weight. It is also possible to use pigments, dyes, and optical brighteners, such as ultramarine blue, phthalocyanines, titanium dioxide, cadmium sulfides, derivatives of perylenetetracarboxylic acid. The amounts usually used of processing aids and stabilizers, such as UV stabilizers, heat stabilizers (e.g. butylated reaction products of p-cresol and dicyclopentadiene; Wingstay L; producer: Goodyear; or else dilauryl thiodipropionate, Irganox, producer: Ciba), lubricants, and antistatic agents (e.g. ethylene oxide-propylene oxide copolymers, such as Pluronic (producer: BASF), if they are used, are usually from 0.01 to 5% by weight, based on the entire molding composition.

The amounts used of the individual additives are generally the respective conventional amounts. The polymers can be mixed in any desired manner with the other constituents, by any of the known methods, to give the molding compositions. However, it is preferable that the components are blended by extruding, kneading, or rolling of the components together, e.g. at temperatures in the range from 180 to 400° C., the components having been isolated, if required, in advance from the aqueous dispersion or solution obtained during polymerization. The copolymerization products obtained in aqueous dispersion can, for example, be precipitated with magnesium sulfate.

The inventive molding compositions can be prepared from the copolymers (A) and, if desired, from the further polymers, the fillers (F), and also from conventional additives (D), by any of the known methods. However, it is preferable that the components are blended via mixing in the melt, for example by extruding, kneading, or rolling the components together. This is carried out at temperatures in the range from 160 to 400° C., preferably from 180 to 280° C.

The invention also provides the use of the molding compositions described for production of moldings, such as sheets or semifinished products, foils, fibers, or else foams. The invention also relates to the corresponding moldings. If foams are prepared with the copolymers (A), these preferably are prepared using a natural gas (carbon dioxide or alkanes).

Processing can be carried out by means of the known methods of thermoplastics processing, and in particular production processes that can be used are thermoforming, extrusion, injection molding, calendering, blow molding, compression molding, pressure sintering or other types of sintering, preference being given to injection molding.

EXAMPLES

The test methods which can be used for characterization of the copolymers (A) or for the thermoplastic molding compositions made with the copolymers (A) and further graft copolymers (B) are briefly collated below:
a) Charpy Notched Impact Resistance (ak) [kJ/m$^2$]:

Notched impact resistance is determined at 23° C. or −30° C. to ISO 179-2/1 eA (F) on test specimens (80×10×4 mm, produced to ISO 294 in a family mold at a melt temperature of 250° C. and at a mold temperature of 60° C.).
b) Flowability (MVR[ml/10']):

Flowability is determined to ISO 1133 B on a polymer melt at 220° C. with a load of 10 kg.
c) Elasticity (Modulus of Elasticity [MPa]); Yield Stress [MPa], Elongation at Break [%]

Elasticity is tested to ISO 527 on test specimens (produced to ISO 294 at a melt temperature of 250° C. and at a mold temperature of 60° C.).
d) Viscosity Viscosity number ($V_Z$) is determined to DIN 53726 on a 0.5% strength solution of the polymer in DMF.
e) Melt Viscosity The melt viscosity is tested in accordance to ISO 6721-10 using a rotational rheometer (SR-5000N, Rheometric Scientific (USA)) in a plate-plate configuration (diameter: 25 mm, shear gap: 1 mm). The samples are dried for 24 h at room temperature under vacuum before testing. Testing starts with a preheating period of 5 min at the measurement temperature of 220° C. The measurement is performed at a shear stress of 1000 Pa starting with a frequency of 500 rad/s and ending with 0.01 rad/s using a logarithmic sweep mode taking 4 data points per decade.
f) Vicat Temperature The Vicat temperature is determined to ISO 306 on test specimens (80×10×4 mm, produced to ISO 294 in a family mold at a melt temperature of 250° C. and a mold temperature of 60° C.).

The examples below are used for further illustration of the invention:

Example 1

General Preparation of Copolymer

Various embodiments of a copolymer matrix comprising DMS can be prepared via solution polymerization, e.g. in an organic solvent, such as toluene or ethylbenzene. A process as described in general terms by way of example in Kunststoff-Handbuch [Plastics Handbook], Vieweg-Daumiller, volume V, (Polystyrol), Carl-Hanser-Verlag, Munich 1969, pages 122 et seq., lines 12 et seq. can be used as the basis for operations here. It is also possible to prepare a matrix in the form of a mixture of two (or more) matrices.

1a) Synthesis in Bulk and Solution Using a Batch Process

The glass flask equipped with stirrer and condenser was flushed with nitrogen. The monomers (acrylonitrile (AN), alpha-para-dimethylstyrene (DMS) or alpha-methylstyrene (AMS)), solvent (ethylbenzene (EB)) and initiator (azaisobutyronitrile (AIBN), dibenzoyl-peroxide (DBO) or tert-butyl-peroxy-pivalat (TBPP)) were poured into the glass vessel while maintaining the nitrogen atmosphere. The reaction mixture was heated to the target temperature and in regular time intervals samples were taken to determine the solid content of the reaction mixture. After 8 h a solution of hydrochinone in DMF was added to stop the polymerization. The solution was cooled to room temperature.

The reaction mixture was poured into methanol while stirred vigorously to precipitate the polymer. The polymer was filtered washed with methanol and dried for at least 10 h under reduced pressure at 60° C.

The resulting copolymers were analyzed by means of Size Exclusion Chromatography (SEC; molar mass), elementary analysis and 1H-NMR (copolymer composition) and DSC (glass transition temperature).

The results of various polymerizations are shown in Table A and in Table B, in which FAN stands for the fraction by weight of acrylonitrile.

TABLE A

| Sample | Composition (wt %) | | | | | | | Temperature (° C.) | Final solid content (wt %) |
|---|---|---|---|---|---|---|---|---|---|
| | AN | DMS | AMS | EB | AIBN | DBO | TBPP | | |
| 1 | 27.6 | 72.0 | | | | 0.4 | | 75 | 27.0 |
| 2 | 27.7 | 72.2 | | | 0.2 | | | 75 | 40.0 |
| 3 | 25.9 | 67.4 | | 6.5 | 0.2 | | | 75 | 33.4 |
| 4 | 27.6 | 72.1 | | | | | 0.3 | 60 | 25.0 |
| 5 | 28.7 | 37.4 | 33.5 | | | 0.4 | | 75 | 23.5 |
| 6 | 29.3 | 19.1 | 51.3 | | | 0.4 | | 75 | 25.4 |
| 7 | 28.2 | 55.1 | 16.4 | | | 0.4 | | 75 | 26.7 |
| 8 | 29.9 | | 69.7 | | | 0.4 | | 75 | 25.2 |
| 9 | 29.9 | | 69.9 | | 0.2 | | | 75 | 28.0 |
| 10 | 29.9 | | 69.8 | | | | 0.3 | 60 | 14.0 |

TABLE B

| | SEC | | | | | |
|---|---|---|---|---|---|---|
| sample | Mn (kg/mol) | Mw (kg/mol) | $F_{AN}$/mol % | $F_{DMS}$/mol % | $F_{AMS}$/mol % | Tg/° C. |
| 1 | 39.7 | 90.4 | 53.4 | 46.6 | | 131.3 |
| 2 | 40.3 | 81.9 | 50.3 | 49.7 | | 131.3 |
| 3 | 31.4 | 57.1 | 52.0 | 48.0 | | 133.2 |
| 4 | 36.0 | 64.4 | 51.0 | 49.0 | | 132.1 |
| 5* | 26.7 | 56.9 | 47.5 | 27.8 | 24.6 | 131.4 |
| 6* | 37.3 | 72.9 | 47.8 | 14.4 | 37.8 | 130.5 |
| 7* | 33.3 | 65.3 | 48.3 | 39.6 | 12.0 | 132.3 |
| 8 | 35.7 | 69.3 | 52.8 | | 47.1 | 126.3 |
| 9 | 29.2 | 56.8 | 48.2 | | 51.8 | 130.3 |
| 10 | 26.7 | 48.7 | 53.4 | | 46.6 | 128.6 |

*indicates samples for which IR-spectroscopy was used to determine the composition 1b) Synthesis in Emulsion Using a Semi-batch Process A glass flask of 2000 ml was filled with the initial charge and heated to 70° C. under nitrogen. Then the feed 1 was added in 3 hours. The solid content was determined after feed 1 was added completely. After waiting for 2 hours the polymerisation mixture was cooled down and the solid content was determined again. The emulsion was poured into a solution of 10% magnesia sulphate preheated to 60° C. to coagulate the emulsion. The precipitated polymer was filtered, washed several times with water and dried at 60° C. under reduced pressure for 15 h.

The resulting copolymer was analyzed by means of SEC (molar mass), 1H-NMR (copolymer composition) and DSC (glass transition temperature).

TABLE X

| | sample 1 | | sample 2 | |
|---|---|---|---|---|
| | initial charge | feed 1 | initial charge | feed 1 |
| Water/wt % | 63.00 | | 63.00 | |
| emulsifier K30/wt % | 0.34 | | 0.34 | |
| NaHCO$_3$/wt % | 0.10 | | 0.10 | |
| K$_2$S$_2$O$_8$/wt % | 0.13 | | 0.13 | |
| AMS/wt % | | | 2.51 | 22.58 |
| DMS/wt % | 2.59 | 23.34 | | |
| AN/wt % | 1.04 | 9.37 | 1.13 | 10.13 |
| TDMK/wt % | 0.01 | 0.08 | 0.01 | 0.08 |
| temperature/° C. | 70 | 70 | 70 | 70 |
| final solid content/wt % | | 36.5 | | 36.8 |

TABLE Y

| | sample 1 | sample 2 |
|---|---|---|
| Solid content (1 h)/wt % | 18.3 | 10.3 |
| Solid content (2 h)/wt % | 25.4 | 15.1 |
| Solid content (3 h)/wt % | 33.3 | 26.9 |
| Final solid content/wt % | 36.5 | 36.8 |
| Mn (kg/mol) | 29.7 | 17.2 |
| Mw (kg/mol) | 199.7 | 124.2 |
| $F_{AN}$/mol % | 47.8 | 50.3 |
| $F_{DMS}$/mol % | 52.2 | |
| $F_{AMS}$/mol % | | 49.7 |
| Tg/° C. | 132.3 | 130.3 |

1c) Synthesis in a Continuously Stirred Tank Reactor (CSTR)

The monomers (DMS, acrylonitrile (AN)), initiator (AIBN) and solvent (Ethylbenzene, [EB]) are fed into a CSTR, which is run at a temperature of 113° C. The feeds are selected in such a manner that the resulting residence time of the CSTR is 45 minutes. Monomer feed composition comprises 59.7-72.6 wt % DMS and 20.8-33.7 wt % AN. AIBN was dissolved in EB and is fed in such amounts that the desired stationary polymer content is achieved (between 16.8 and 27.1 wt % for the investigated samples). Table C gives the description of typical experimental conditions with the corresponding solids content. Table D contains the analytical data of the resulting polymers. Copolymer-composition was determined via 1H-NMR.

Molar masses were determined with SEC. Glass transition temperatures (T$_g$) were acquired via typical DSC-experiments.

The results are shown in Table C and Table D, wherein AN denotes acrylonitrile, DMS denotes dimethyl styrene and EB denotes ethyl benzene.

TABLE C

| Sample No. | Composition of feed (wt %) | | | Reaction temperature ° C. | Stationary solids content |
|---|---|---|---|---|---|
| | AN | DMS | EB | | |
| 1 | 26.6 | 66.4 | 7 | 113 | 17% |
| 2 | 26.6 | 66.4 | 7 | 113 | 22% |
| 3 | 20.8 | 72.6 | 6.6 | 113 | 17% |
| 4 | 33.7 | 59.7 | 6.6 | 113 | 27% |
| 5 | 26.6 | 66.4 | 7 | 113 | 22% |

TABLE D

| Sample No. | SEC* $M_N$ in kg/mol | SEC* $M_W$ in kg/mol | $F_{AN}$** molar % in polymer | $F_{DMS}$ molar % in polymer | $T_g$ ° C. |
|---|---|---|---|---|---|
| 1 | 46.4 | 78.0 | 49.4 | 50.6 | 130 |
| 2 | 27.3 | 45.0 | 50.4 | 49.6 | 130 |
| 3 | 25.4 | 28.8 | 46.4 | 53.6 | 132 |
| 4 | 33.7 | 54.6 | 50.1 | 49.9 | 128 |
| 5 | 27.9 | 44.4 | 48.6 | 51.4 | 131 |

Example 2

Synthesis in a Continuously Stirred Tank Reactor (CSTR)

The monomers (DMS, AN), initiator (AIBN) and solvent (EB) are fed into a CSTR, which is run at a temperature of 113° C. The feeds are thus selected that the resulting residence time of the CSTR is 4.5 hours. The volume of the CSTR is 5 L. AIBN was dissolved in ethyl benzene and is fed at suchs rates that a stationary solid content of 40% is achieved. Table E contains data of the experiment.

Molar masses were determined with SEC.

TABLE E

| Sample No. | Time window since start of feeds in which sample was collected | solids content/% | Mn kg/mol | Mw kg/mol |
|---|---|---|---|---|
| 1 | 3-7.8 h | 13.6 | 20.9 | 41.8 |
| 2 | 7.8-12.5 h | 35.3 | | |
| 3 | 12.5-17 h | 33.9 | | |
| 4 | 17-21 h | 38.1 | | |
| 5 | 21-25 h | 42.8 | 29.3 | 65.4 |
| 6 | 25-29 h | 43.6 | | |
| 7 | 29-33 h | 41.6 | | |
| 8 | 33-37 h | 44.5 | | |
| 9 | 37-41 h | 41.6 | | |
| 10 | 41-45 h | 40.7 | | |
| 11 | 45-49 h | 39.0 | 26.5 | 67.9 |
| 12 | 49-53 h | 36.4 | | |
| 13 | 54-57 h | 36.6 | 25.8 | 66.9 |
| 14 | 57-61 h | 36.6 | | |
| 15 | 61-65 h | 36.3 | 26.2 | 68.8 |

Example 3

Using the procedure as described in Example 1a, larger quantities of polymer were synthesized. The composition at the beginning of the polymerization contained 27.7 w % AN, 72.2 w % DMS and 0.18 w % AIBN. This material was used to characterize mechanical and rheological properties. As a comparative material the commercially available copolymer Luran KR 2556 (of BASF, Germany) made out of alpha-methyl styrene (70 w %) and acrylonitrile (30 w %) was tested.

Results are provided by Table F. The new material shows an improved glass transition temperature (Tg) and a better flow (MVR) even though the Mw is slightly higher than the one of the comparative material. Furthermore, surprisingly the results from viscosity measurements in the rotational rheometer at 220° C. show decreased viscosity over the whole frequency range for the material according to the invention, which can be seen in FIG. 1, wherein:
a: sample 1,
b: sample 2 (comparative material),
x: angular frequency ω(rad/s),
y: viscosity |η*|(Pa·s).

TABLE F

| | sample 1 | sample 2 (comparative material) |
|---|---|---|
| w % AN | 27.7 | 30 |
| w % comonomer | 72.3 (DMS) | 70 (alpha methyl styrene) |
| Mn (kg/mol) | 45.6 | 38.7 |
| Mw (kg/mol) | 106.8 | 93.6 |
| Tg (° C.) | 132 | 129 |
| viscosity Vz (ml g) | 54 | 57 |
| MVR (ml/10 min) | 17 | 9 |
| melt viscosity 220° C. at zero shear rate (Pa s) | $6.41 \cdot 10^3$ | $1.34 \cdot 10^4$ |

Example 4

In the following example 4a rubber modified thermoplastic copolymer was prepared using the following components:
1. 25 w % of a butadiene based rubber
2. 35 w % of a SAN copolymer with 24 w % AN and 76 w % S and an viscosity number of 64 cm³/g
3. 40 w % of
   a) sample 1 described in Example 3 (The final composition is denoted as sample 1-1)
   b) comparative material described in Example 3 (The final composition is denoted as sample 1-2).

The powders of the three components were premixed and compounded using a regular extruder such as Haake PTW16 extruder with 16 mm screw diameter and L/D=25, with a dosing zone, melting zone, mixing zone and degassing zone, finished by the die head with 1-2-3 holes with a diameter of 2 mm. The strand of polymer melt was fed through a water bath, cooled down and cut with a cutter to granules. The barrel temperature of the extruder was 250° C., the screw speed was set to 200 rpm and the throughput was 1000 g/h.

The test results of the samples are given in Table G.

Sample 1-1 using the composition according to the invention shows significantly better flow properties compared to the comparative sample 1-2, which contains a prior art composition.

TABLE G

| | sample 1-1 | sample 1-2 |
|---|---|---|
| MVR (220/10) | 20 | 8.6 |
| Vicat B (° C.) | 106 | 105 |
| ak (23° C.) | 8.3 | 11 |
| ak (−30° C.) | 4.6 | 6.4 |
| modulus of elasticity (MPa) | 2426 | 2594 |
| yield stress (MPa) | 47.2 | 53.5 |
| Elongation at Break (%) | 6.5 | 9.0 |

The invention claimed is:

1. A thermoplastic copolymer (A) which comprises:
   A1: from 38 to 58 mol-percent, based on the copolymer, of at least one of the monomers from the group consisting of acrylonitrile, acrylate, methacrylate and N-phenyl-maleic imide; and
   A2: from 42 to 62 mol-percent, based on the copolymer, of a mixture of para-alpha-dimethylstyrene with alpha-methylstyrene, whereby the weight ratio of the components para-alpha-dimethylstyrene and alpha-methyl-styrene is between 1 to 4 and 4 to 1.
2. The thermoplastic copolymer (A) according to claim 1, wherein the component A1 is acrylonitrile, $C_1$-$C_{12}$-alkyl-acrylate, $C_1$-$C_{12}$-methalkyl-acrylate or N-phenyl-maleic imide.

3. The thermoplastic copolymer (A) according to claim 1, which comprises from 42 to 54 mol-percent of the component A1 which is acrylonitrile or N-phenyl-maleic imide, and which comprises from 46 to 58 mol-percent of the component A2, which contains para-alpha-dimethylstyrene and alpha-methylstyrene.

4. The thermoplastic copolymer (A) according to claim 1, which is composed of 48 to 58 mol-percent of the monomer para-alpha-dimethylstyrene and of 42 to 52 mol-percent of acrylonitrile.

5. A thermoplastic molding composition comprising a thermoplastic copolymer (A) which comprises:
   A1: from 38 to 58 mol-percent, based on the copolymer, of at least one of the monomers from the group consisting of acrylonitrile, acrylate, methacrylate and N-phenyl-maleic imide; and
   A2: from 42 to 62 mol-percent, based on the copolymer, of para-alpha-dimethylstyrene or of a mixture of para-alpha-dimethylstyrene with other styrene-derivatives having 9 or 10 carbon atoms,
a graft copolymer (B) and as further component (K), one or more components selected from the group of a dispersing agent (DA), a buffer substance (BS), a molecular weight regulator (MR), a filler (F), and an additive (D).

6. The thermoplastic molding composition according to claim 5, wherein the graft copolymer (B) is an ABS copolymer.

7. The thermoplastic molding composition according to claim 5, wherein the further component is at least one further thermoplastic polymer (TP) selected from the group consisting of an ABS-copolymer, a SAN-copolymer, a polycarbonate, a polyester carbonate, a polyester and a polyamide.

8. A molding, produced from at least one thermoplastic molding composition containing the thermoplastic copolymer (A) according to claim 1.

9. A process for preparation of the thermoplastic copolymer (A) as claimed in claim 1, which comprises the step of bulk polymerization, emulsion polymerization or solution polymerization of para-alpha-dimethylstyrene and other styrene-derivatives with monomers from the group comprising acrylonitrile, acrylate, methacrylate and N-phenyl-maleic imide.

10. The process according to claim 9, comprising the step of bulk polymerization or solution polymerization of a mixture comprising para-alpha-dimethylstyrene and acrylonitrile.

11. The process according to claim 9, which comprises preparing the thermoplastic copolymer (A) via bulk polymerization, emulsion polymerization or solution polymerization, preparing a graft copolymer (B), and then mixing the thermoplastic copolymer (A) and the graft copolymer (B), and optionally a further component (K) and/or a further thermoplastic polymers (TP).

* * * * *